April 22, 1941.  H. P. BRADLEY  2,239,659
ART OF TREATING RUBBER
Filed Dec. 10, 1936  5 Sheets-Sheet 1

100X

100X

100X

100X

Inventor
Harry P. Bradley
By Albert L. Ely
Attorney

April 22, 1941.  H. P. BRADLEY  2,239,659
ART OF TREATING RUBBER
Filed Dec. 10, 1936  5 Sheets-Sheet 2

Inventor
Harry P. Bradley
By Albert L. Ely
Attorney

April 22, 1941.   H. P. BRADLEY   2,239,659
ART OF TREATING RUBBER
Filed Dec. 10, 1936   5 Sheets-Sheet 4

250X

250X

Inventor
Harry P. Bradley
By Albert L. Ely
Attorney

April 22, 1941.  H. P. BRADLEY  2,239,659
ART OF TREATING RUBBER
Filed Dec. 10, 1936   5 Sheets-Sheet 5

Fig. 16.

- Mill the rubber to break it down.
- Mill reinforcing pigments into the rubber with or without softening agents or with or without an accelerator and an activator.
- Heat treat the reinforcing pigments-rubber mix for determinate period at corresponding desired temperature.

Fig. 21.

- Mill the rubber to break it down.
- Mill reinforcing pigments into the rubber with or without softening agents or with or without an accelerator and an activator.
- Heat treat the reinforcing pigments-rubber mix for determinate period at corresponding desired temperature.
- Mill the stiffened, heat-treated stock to break it down.
- Add new rubber with or without further compounding ingredients and/or vulcanizing agents and mix by milling.
- Vulcanize

Fig. 17.

- Mill the rubber to break it down.
- Mill reinforcing pigments into the rubber with or without softening agents or with or without an accelerator and an activator.
- Heat treat the reinforcing pigments-rubber mix for determinate period at corresponding desired temperature.
- Mill the stiffened, heat-treated stock to break it down.

Fig. 20.

- Mill the rubber to break it down.
- Mill reinforcing pigments into the rubber with or without softening agents or with or without an accelerator and an activator.
- Heat treat the reinforcing pigments-rubber mix for determinate period at corresponding desired temperature.
- Mill the stiffened, heat-treated stock to break it down.
- Add new rubber with or without further compounding ingredients and/or vulcanizing agents and mix by milling.

Fig. 18.

- Mill the rubber to break it down.
- Mill reinforcing pigments into the rubber with or without softening agents or with or without an accelerator and an activator.
- Heat treat the reinforcing pigments-rubber mix for determinate period at corresponding desired temperature.
- Mill the stiffened, heat-treated stock to break it down and mill in vulcanizing agents.

Fig. 19.

- Mill the rubber to break it down.
- Mill reinforcing pigments into the rubber with or without softening agents or with or without an accelerator and an activator.
- Heat treat the reinforcing pigments-rubber mix for determinate period at corresponding desired temperature.
- Mill the stiffened heat-treated stock to break it down and mill in vulcanizing agents.
- Vulcanize INVENTOR
Harry P. Bradley
BY Albert L. Ely
ATTORNEY Patented Apr. 22, 1941

2,239,659

UNITED STATES PATENT OFFICE 2,239,659

ART OF TREATING RUBBER

Harry P. Bradley, Cuyahoga Falls, Ohio, assignor to The Firestone Tire & Rubber Company, Akron, Ohio, a corporation of Ohio Application December 10, 1936, Serial No. 115,232

39 Claims. (Cl. 260—763)

This invention relates to the art of treating rubber, and more especially it relates to the treatment of rubber composition during the compounding thereof. This application is a continuation in part of my prior application Serial No. 656,889, filed February 15, 1933, which was co-pending with the present application.

In the modern practice of compounding rubber, it has been found that certain pigments milled into the rubber will produce a reinforcing effect, resulting in improved abrasion resisting qualities in the vulcanized rubber.

It is commonly believed that, in order to obtain the most effect from any given reinforcing pigment, the pigment should be completely wetted by the rubber and the individual particles should be homogeneously distributed through the rubber. Prior to my invention master batching and additional milling were used to accomplish this end, and thus to produce the maximum reinforcing effect with any given pigment.

I have found that it is possible to so treat a rubber-carbon mix that the carbon black is caused to migrate to form a reticular structure with rubber of lower carbon black concentration in the regions from which the carbon black has migrated. Upon subsequent milling this reticular network is broken up and the fragments thereof comprising flocculated carbon black and rubber are distributed throughout the mix in such a way as to exist in the form of pellets in a matrix having lower carbon black content than that of the pellets.

It is to be noted that the ultimate effect produced by this invention in which the carbon black is caused to migrate into concentrated areas was heretofore universally thought to be very detrimental to the strength and abrasive characteristics of rubber compounds. In other words, by this invention the resulting composition has a heterogeneous arrangement in which the amount of reinforcing pigment is not evenly distributed and all of the individual particles of carbon are not homogeneously arranged in the rubber contained in the composition.

One of the major objects of this invention is to provide an improved rubber composition which has improved abrasive resisting characteristics.

Another object of this invention is to provide an improved rubber composition, which after subsequent milling and vulcanization, has improved abrasive resistance and reduced hysteresis losses.

Another object of this invention is to provide a rubber composition and method of making same in which the rubber composition is heat treated to give it characteristics different from that of the same composition of rubber which is not treated.

Another object is to provide an improved vulcanizable rubber composition and method of making same in which an initial mixture comprising a quantity of rubber and carbon black is heat treated to cause flocculation of the carbon black, and is thereafter milled and mixed with other compounding ingredients, with or without additional rubber.

Another object of this invention is to provide a rubber composition which has improved abrasion-resisting characteristics and at the same time has less internal friction whereby less internal heat will be developed in the composition when the latter is subjected to flexing.

Another object of the invention is to provide an improved tire having a tread in which the internal friction or hysteresis loss, while the tire is operating under actual conditions of use, is greatly reduced.

Other objects of this invention are to produce an improved rubber composition which, while softer in the vulcanized state than the same composition processed by ordinary means, has a higher modulus; which has a lower permanent set; which has greatly enhanced wearing or abrasion resisting qualities; and which has normal tensile strength. More specifically, the invention aims to effect improved reinforcement of rubber whereby the aforesaid objects are achieved.

Referring to the drawings.

Figure 9:
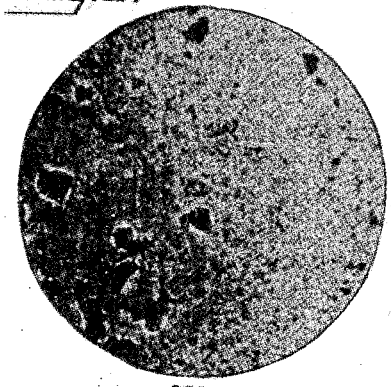
Figures 9 and 10 are photomicrographic sections of an untreated master batch mixture of crude rubber and carbon black, and of a treated master batch mixture of crude rubber and carbon black, respectively, before remilling, magnified 250 diameters.
Figure 10:
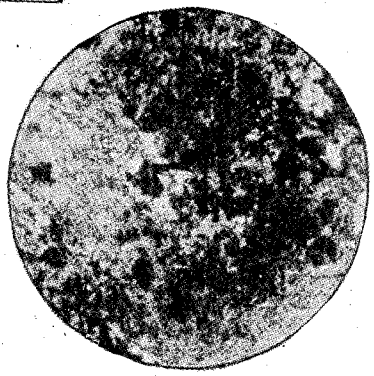
Figure 11:
Figure 12:
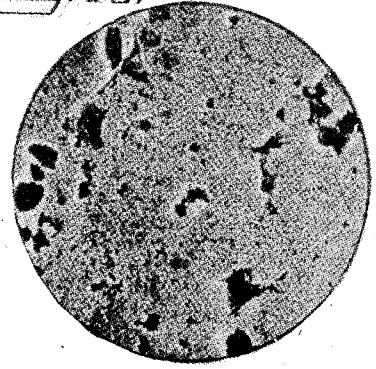

Figures 11 and 12 show, respectively, photomicrographic sections of the untreated and treated master batches of Figures 9 and 10 after remilling, magnified 250 diameters.

Figure 13:
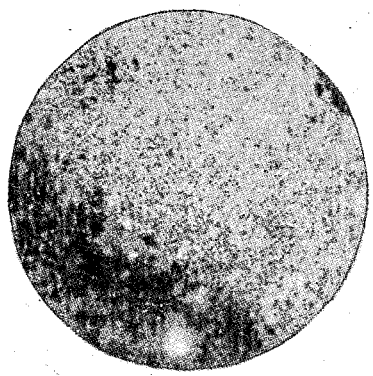

Figure 13 is a photomicrographic section of a final stock made from untreated master batch milled with uncured rubber and magnified 250 diameters.

Figure 14:
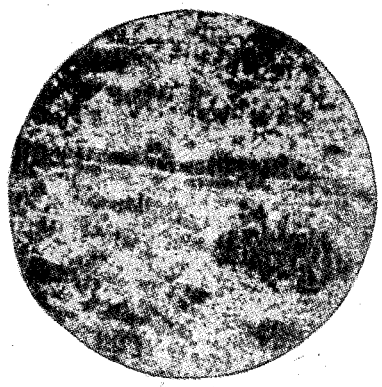

Figure 14 is a photomicrographic section at 250 diameters magnification of a final stock made from a master batch heat treated in accordance with the present invention and milled with additional uncured rubber.

Figure 15:
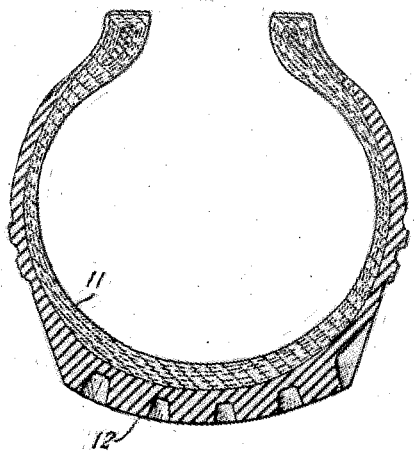

Figure 15 is a cross section of a tire, in which rubber treated in accordance with the present invention is incorporated.

Figures 16 to 21 inclusive, are flow diagrams of the various methods disclosed herein employing applicant's invention.

Broadly, the invention contemplates milling, or otherwise thoroughly mixing together crude rubber and suitable reinforcing carbon black or other pigments, and then heat treating such mixture to form a stiffened composition. The rubber composition is so treated and stiffened to comprise a master batch which may be subsequently milled and mixed with other compounding ingredients, with or without additional untreated rubber, and vulcanized. The product resulting from such a method is a vulcanized rubber composition which, while softer as measured by the penetrometer, has a higher modulus, a lower permanent set, tensile strength unaffected, wearing or abrasion-resisting qualities greatly enhanced, and which has a lower hysteresis loss and consequently a lower running temperature when flexed as in a tire tread, as compared with an identical composition which has not been so treated. It is to be understood that the rubber composition of this invention may be reinforced in the usual manner, as for instance with the usual cord fabric before vulcanization.

The master batch is preferably heated under "static" conditions which cause a physical or chemical change which can be noted by testing samples for stiffness on a plastometer. It is to be understood that by "static" heat treatment it is meant that the mixture of rubber and reinforcing agents is heated while there is no kneading, agitation or milling action taking place and while there is no internal motion of one part of the rubber mass with respect to other adjacent parts. Preferably the heat treatment should take place in a closed container filled with an inert medium substantially free of oxygen in order to prevent oxidation of the rubber. It is found that there is a progressive stiffening of the unvulcanized rubber compound until at the end of such static heat treatment the composition has lost a very high percentage of its plasticity. The photomicrographs show only the change in distribution of black. Other physical and chemical changes may accompany this change.

The stiffening effect is progressive, as noted above, less time being required for producing stiffening at higher temperatures than at lower temperatures. A master batch may be stiffened within a practical heat treating period at a vulcanizing temperature of approximately 260° F. to 360° F.

It is to be understood that throughout this specification reinforcing carbon black pigments refers preferably to carbon black made by the channel or disc processes and free flame carbon blacks commercially known as "Gastex" and "Fumonex." It has been found that the invention may be carried out by the use of other surface active reinforcing pigments such as certain types of zinc oxide and other types of carbon black.

In addition to improving the abrasion resistance of the finished vulcanized compound through the provision of stiff, tough pellets of rubber, the vulcanized rubber compound resulting from the invention also has improved wearing life owing to the reduction in the running temperature caused by flexure such as occurs in a tire tread.

A microscopic examination of a rubber-carbon black master batch at different stages of the heat treatment discloses that a structural change takes place in the rubber compound. For such an examination a small particle of the master batch is placed in a Quetschkammer, the rubber compound being spread out into a thin film. This device is a stage capable of being heated to the desired temperature, which is in this case 135° C. As the heating progresses the carbon black appears to migrate and collect in floccules which form a reticular network or chain structure which is coextensive with other matter of lower ratio carbon-rubber composition. In other words, the two phases exist as networks, both of which are continuous and extend throughout the same cubical space. This migration of carbon black appears to leave some parts of the intervening composition substantially devoid of carbon.

In the accompanying figures of photomicrographs, the dark areas represent a high ratio of carbon black to rubber composition and the lighter areas represent a lower ratio of carbon black to rubber composition.

Figure 1:
Figures 1, 2, 3 and 4 are photomicrographs of a section of rubber composition containing carbon black, magnified 100 diameters, the composition being heat treated according to this invention for progressively longer periods and showing changes in the distribution of the carbon black and rubber.

Figure 1 is a photomicrograph of such a milled composition of rubber and carbon black which has been statically heat treated for approximately one-half hour.

Figure 2:
Figure 3:
Figure 4:
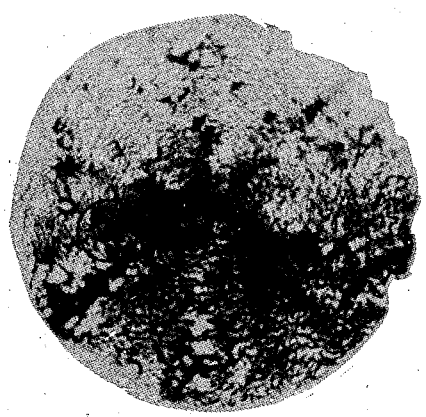
Figure 5:
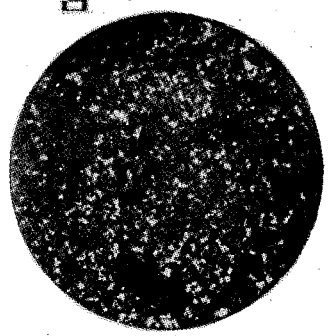
Figures 5, 6, 7 and 8 are sections corresponding to Figures 1, 2, 3 and 4, under greater magnification of 500 diameters, taken in the field shown in the circles therein.
Figure 6:
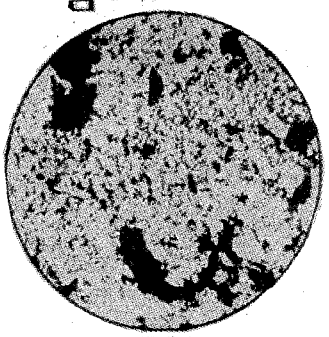
Figure 7:
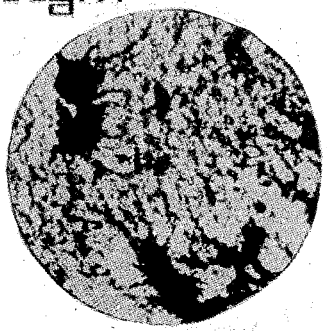
Figure 8:
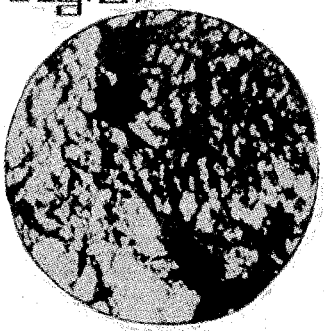

Figure 2 shows the change or migration of the carbon black particles into agglomerates or floccules after the composition has been statically heat treated for one and one-half hours. Further migration of the carbon black particles to form a chain-like structure or network of carbon black; the effect of the static heat treatment on the compositions after treatment of six hours, is shown in Figure 3. Figure 4 shows the effect of heat treatment for twelve hours. Figures 5, 6, 7, and 8 show the flocculated structure in greater detail.

Reference to Figures 9 and 10 shows the comparison between the comparatively homogeneous structure of an untreated rubber-carbon black mix (Fig. 9) in which the individual carbon particles are more or less completely surrounded by rubber, and the heterogeneous structure of a heat treated rubber-carbon black mix (Fig. 10).

The comparative effect of subsequent milling on untreated and treated rubber-carbon mixes, respectively, is shown in Figures 11 and 12. It is to be noted that the subsequent milling operation produces progressive dispersion of the carbon black, the final product shown in Figure 11 being a substantially complete dispersion of carbon black in the rubber, while in the case of the treated mix of Figure 10 subsequent milling of the material (Fig. 12) breaks down the network but does not bring about further disintegration of the pellets formed from the network, and does not result in complete dispersion of the carbon black. The remaining pellets can be distinguished readily as dark areas in Figure 12.

The same comparison is shown in Figures 13 and 14, where Figure 13 shows a final stock made by milling an untreated master batch with additional rubber and vulcanizing agents, and may be seen to be quite homogeneous. Figure 14 shows the heterogeneous final stock resulting from mixing a treated master batch with additional rubber and vulcanizing agents. It will be readily seen that the structures in the two latter figures are quite different, the dark areas of Figure 14 being the pellets of high carbon black concentration, while the clear areas have lower carbon black concentration and constitute a softer matrix wherein the harder pellets are dispersed. These photographs are probably more satisfactory representations of the actual conditions in the stock than those of Figures 9 to 12. The proportions of dark area to light area in Figure 14 are accurate representations of the actual cross sections of the batch, since true sections were made by means of a microtome. This technique is much more difficult than that used in obtaining Figures 9 to 12, and successful microtome sections, as those of Figures 13 and 14, were obtained in only very few cases.

It is to be understood that in referring to Figures 9 and 10 reference has been made to rubber-carbon black mixes, but the addition of other compounding ingredients (except vulcanizing agents) will not substantially alter the desirable characteristics of the final stock. It is to be further understood that the addition of other compounding ingredients (except vulcanizing agents) is not important and does not alter the basic inventive concept.

This product comprises a non-homogeneous mixture in which the rubber having high carbon block concentration exists in the form of discrete pellets in a continuous matrix of softer rubber having a lower carbon black concentration. After this mixture is vulcanized the greatest flexing takes place in the softer matrix, resulting in much lower internal friction and temperature rise under conditions of use. The reduction in the internal friction and heat reduces the probability of failure caused by heat decomposition and results in a longer life. The small pellets of the treated rubber take the greater part of the wear and greatly contribute to the abrasion resistance.

As is well known, heat adversely affects the useful life of a tire because the heat weakens and tends to destroy cellulose fibers and causes decomposition of rubber. It is therefore highly desirable to reduce to a minimum under conditions of actual use, the amount of heat generated in a tire, which is due to internal friction or hysteresis loss caused by the movement of the elements of the rubber relative to each other. According to the present invention a rubber stock is provided in which the interspersion of small discrete pellets of tough, stiff rubber in a matrix of soft rubber makes it possible to produce a tire in which the temperature developed under conditions of actual use is from 15 to 40 degrees F. lower than that of tires made of rubber stock in which the rubber composition is comprised of a homogeneous texture and which has the same percentage of reinforcing ingredients.

As a specific example of the embodiment of the invention, a temperature from 260° to 310° F. and a corresponding treating period from six to two hours has been found to produce the desired results on a rubber-carbon black mixture. No vulcanizing agent is present in the batch during this heating, and the temperatures employed are substantially vulcanizing temperatures. After such heat treatment the master batch may be milled with additional pigments (if required), vulcanizing agent, and softeners or accelerators as desired, and then vulcanized in the usual or desired manner. The result is a vulcanized rubber composition having the several desirable characteristics set forth above.

During the initial heat-treating operation a physical or chemical change takes place which manifests itself in a progressive stiffening of the rubber composition as the heating is continued. Vulcanized rubber made from the batch, which is remilled after heat treatment, is softer than vulcanized rubber made from a batch of identical composition which has not been so heat treated.

The following examples will illustrate an embodiment of the invention:

*Example I*

A batch consisting of—

|   | Pounds |
|---|---|
| Rubber | 100 |
| Carbon black | 67 |

To produce the desired change at 260° F. it is preferred to heat the mixture for six hours. The change continues at a very slow rate beyond six hours. The change may also be produced at other temperatures, for example—

| 4 hours at | 280° more or less |
|---|---|
| 2 hours at | 300° more or less |

The heat treating preferably is carried out in a medium not having an appreciable free oxygen content, since oxygen may produce undesirable properties such as loss of tensile strength. The use of an inert fluid such as nitrogen, water or steam is preferred, but the result can be produced by treatment of the master batch in a press or in vacuo.

A batch made according to Example I was heat treated two hours at 300° F. in an inert atmosphere, and subsequently remilled with vulcanizing agents, pigments and accelerators, to form a stock of the following composition:

|   | Pounds |
|---|---|
| Rubber | 100 |
| Carbon | 67 |
| Sulphur | 3 |
| Stearic acid | 4 |
| Zinc oxide | 5 |
| Mercaptobenzothiazole | 1.25 |

A similar batch was not heat treated, but vulcanized in the same manner as the treated stock and comparative tests on both batches showed the following results:

|   | Treated | Untreated |
|---|---|---|
| Penetrometer hardness | 35 | 26 |
| Operative temp. °F. | 247 | 285 |
| Permanent set percent | 21.5 | 24 |
| Compression set | 9.3 | 11.8 |
| Modulus lb./sq. in. | 3,625 | 2,900 |
| Tensile strength lb./sq. in. | 3,900 | 3,850 |

Two other final mixes were prepared with a lower carbon content of 45 pounds, all of the other amounts of ingredients remaining the same, and comparative tests on the heat treated and untreated batches showed the following results:

|   | Treated | Untreated |
|---|---|---|
| Penetrometer hardness | 50 | 42 |
| Operative temp. °F. | 211 | 237 |
| Permanent set percent | 14 | 16 |
| Compression set | 8 | 12.8 |
| Modulus lb./sq. in. | 3,450 | 2,950 |
| Tensile strength lb./sq. in. | 4,200 | 4,350 |

From the above results, it will be readily seen that heat treatment of both stocks decreases the hardness thereof by approximately the same amount; the hysteresis loss is reduced more by the heat treatment of the high carbon stock; there is a slightly higher decrease in permanent set in the treated high carbon stock; the increase in modulus in both heat treated stocks is about the same, while the tensile strength of both the high and low carbon stocks is substantially unaffected.

The effect of the heat treatment on rubber-carbon mix is the great reduction of operating temperature or temperature rise due to internal friction when the rubber stock is continuously flexed. From the above tabulated results it will be noted that in the heavily carbon-loaded stock operating temperature of the heat treated stock is about 38 degrees lower than in the untreated stock. While there is a smaller difference of operating temperature between the treated and untreated lower carbon stocks, this difference results in a greatly improved tread stock for tires. The use of such a tread stock greatly increases the life of a tire because there is less deterioration of the cords of the fabric and at the same time oxidation of the rubber is greatly reduced.

If desired, additional crude rubber may be added and milled with the formula given in Example I before vulcanization.

Another modification of the invention may comprise mixing rubber and carbon black with other compounding ingredients, except vulcanizing agents, subsequently heat treating, milling, and finally vulcanizing.

A typical example embodying this modification would be as follows:

Example II

| | Pounds |
|---|---|
| Rubber | 100 |
| Carbon black | 76.6 |
| Stearic acid | 5.0 |
| Pine tar | 5.1 |
| Zinc oxide | 3.3 |
| Accelerator | 1.5 |

The formula given above (Example II) may then be heat treated for approximately two hours at 300° F. and mixed with vulcanizing ingredients and vulcanized in the usual manner.

As a further variation of the above procedure, a batch may be made by mixing carbon black, zinc oxide, and accelerator with rubber and heat treating for the periods of time and at the temperatures given in the first example.

A typical batch according to this method might be as follows:

Example III

| | Pounds |
|---|---|
| Rubber | 100 |
| Carbon black | 76.6 |
| Stearic acid | 5.0 |
| Pine tar | 5.1 |
| Zinc oxide | 3.3 |
| Accelerator | 1.5 |

This batch was heated for two hours at 300° F. and mixed by means of further milling with additional crude rubber and curing ingredients to give a composition as follows:

| | Pounds |
|---|---|
| Rubber | 100 |
| Carbon black | 50 |
| Stearic acid | 3 |
| Pine tar | 3 |
| Sulfur | 3 |
| Accelerator | 1.5 |
| Zinc oxide | 3.3 |

The operating temperature of this stock was 208° F. as compared with 233° F. for a control stock of identical composition.

In the above example it will be noted that the treated and untreated batches which are milled together have substantially the same ratio of zinc oxide and accelerator to the rubber so that in the final product after remilling the pellets having the high carbon content will contain substantially the same amount of zinc oxide and accelerator as the regions having the lower carbon content, in order that during the vulcanization process there will be no definite line of demarcation relative to state of cure between the tough and the softer regions in the rubber composition. This is desirable because during the second milling operation the tougher pellets are formed and unless the zinc oxide is added prior to the formation of these pellets and mixture with the remaining compounding ingredients, the zinc oxide and accelerator will not migrate into the tough particles during the vulcanization process, with the result that a somewhat lower tear resistance is imparted in the vulcanized composition.

It is necessary that the zinc oxide and accelerator be added to the master batch before heat treatment in order to get these ingredients in the pellets, since the zinc oxide and accelerator will not migrate during the subsequent milling and vulcanization. The pro rata distribution of zinc oxide and accelerator in the pellets and soft matrix increases the tear resistance of the stock.

In Figure 15 is shown a section of a tire embodying the present invention. The tire has the usual carcass 11, built up of ply fabric according to any of the well known methods and a tread portion 12, which is formed of rubber stock treated in accordance with the method set forth hereinbefore. In accordance with known practice, any desired variation of construction may be used, the essential feature of the invention residing in the fabrication of a tire using the heat treated tread stocks as above described to produce a tire having a greatly reduced temperature rise under operating conditions.

The flow diagram illustrating Figure 16 sets forth the steps of the method for producing the heat-treated master batch resulting in a form of the invention salable per se as an article of commerce. The step of heat-treating set forth in this and the subsequent flow diagrams may or may not take place under static conditions, in accordance with the type of article desired or depending upon the method and equipment employed. Figure 17 is a flow diagram similar to Figure 16 in which the additional step of milling the heat-treated mixture is added. This produces a different type of article, salable per se, in which flocoules of rubber containing higher concentrations of reinforcing pigment are dispersed through the remaining mass. In this product the flocculated network of reinforced pigment is broken up into pellets dispersed throughout the mass. Figure 18 is a flow diagram setting forth the steps of the diagram of Figure 17 and in addition calling for the milling in of vulcanizing agents, which process results in a form of the invention adapted for sale as a repair rubber compound, such as tube patches and camelback for retreading tires. Figure 19 is a flow diagram of the process of Figure 18 with the additional step of vulcanization which results in the final vulcanized product. Figure 20 is a flow diagram setting forth the method steps of Figure 17 with the additional step of adding new rubber, compounding ingredients, and vulcanizing agents, thereby producing a composite unvulcanized rubber product suitable for camelback and the like, in which flocoules of stiffened rubber are dispersed throughout the matrix of reinforced softer rubber. Figure 21 is a flow diagram including the final vulcanization step based on the method steps of Figure 20, and the product obtained is different from any of those produced by any of the other methods disclosed.

I do not wish the invention to be limited to the foregoing examples, since other combinations and conditions may be used without departing from the spirit of the invention or the scope of the appended claims.

What is claimed is:

1. The method of forming a rubber composition which comprises mixing rubber and carbon black, heat treating said mixture at such temperatures and for a sufficient time to cause stiffening of said mixture, adding zinc oxide, an accelerator, and sulphur, and thereafter milling said mixture and vulcanizing.

2. The method of forming rubber composition which comprises mixing rubber and carbon black, zinc oxide, or other reinforcing pigments, subjecting the mixture to substantially vulcanizing temperature for a time sufficient to cause stiffening of said mixture in the absence of a vulcanizing agent, milling said treated composition and adding a vulcanizing agent during milling.

3. The method of treating rubber which comprises forming a mixture comprising rubber and carbon black, and then heat treating said mixture in the absence of a vulcaniizng agent for a period of time sufficient to cause stiffening of said mixture.

4. The method of forming rubber composition which comprises mixing rubber and carbon black, subjecting the mixture to substantially vulcanizing temperature for a sufficient time to cause stiffening of said mixture in the absence of a vulcanizing agent, subsequently milling said mixture and adding a vulcanizing agent.

5. The method of treating rubber which comprises forming a mixture comprising rubber and carbon black, and then subjecting said mixture to heat at such temperatures and for a sufficient time to cause stiffening of said mixture in the absence of a vulcanizing agent while said mixture is in a static condition.

6. A method of treating rubber to produce a composition which in the vulcanized state has a higher modulus, decreased permanent set, enhanced wearing and abrasion resisting qualities, and undiminished tensile strength, which includes milling rubber with carbon black, zinc oxide or other reinforcing pigments without vulcanizing agents to produce a master batch, and heating the master batch at a substantially vulcanizing temperature for a time sufficient to substantially stiffen the batch, and subsequently milling the master batch.

7. A method of treating rubber to produce a composition which in the vulcanized state has a higher modulus, decreased permanent set, enhanced wearing and abrasion resisting qualities and undiminished tensile strength, which includes milling rubber with carbon black, zinc oxide or other reinforcing pigments and without vulcanizing agents to produce a master batch, and heating the master batch while in a static condition at a vulcanizing temperature of approximately 260° F. to 360° F. for a time sufficient to substantially stiffen the batch.

8. A method of producing vulcanized rubber to provide a composition which in the vulcanized state has a higher modulus, decreased permanent set, enhanced wearing and abrasion resisting qualities, and undiminished tensile strength, which includes milling rubber with carbon black, zinc oxide and an accelerator and without vulcanizing agents to produce a master batch, heating the master batch at a substantially vulcanizing temperature for a time sufficient to substantially stiffen the batch.

9. A method of producing vulcanized rubber to provide a composition which in the vulcanized state has a higher modulus, decreased permanent set, enhanced wearing and abrasion resisting qualities, and undiminished tensile strength, which includes milling rubber with carbon black, zinc oxide or other reinforcing pigments and without vulcanizing agents to produce a master batch, heating the master batch while in a static condition at a vulcanizing temperature of approximately 260° to 360° F. for a time sufficient to substantially stiffen the batch, mixing the master batch with a vulcanizing agent, and vulcanizing such mixture.

10. The method of treating rubber which comprises forming a mixture comprising rubber and carbon black, then subjecting said mixture to heat in the absence of a vulcanizing agent and while said mixture is in a static condition, until said mixture is substantially stiffened, and then milling said treated mixture.

11. The method of treating rubber which comprises forming a mixture comprising rubber and carbon black, then subjecting said mixture to heat in the absence of a vulcanizing agent while said mixture is in a static condition, until said mixture is substantially stiffened, and then milling said treated mixture, and thereafter vulcanizing said mixture.

12. The method of making a rubber composition which comprises mixing rubber and carbon black, subjecting said mixture to heat at such temperatures and for a sufficient time to cause stiffening of said mixture in the absence of a vulcanizing agent, milling said mixture and adding zinc oxide, an accelerator, a vulcanizing agent, and additional crude rubber, and thereafter vulcanizing said composition.

13. The method of making rubber stock comprising mixing together rubber, carbon black, zinc oxide, and an accelerator, subjecting said mixture to heat in the absence of a vulcanizing agent until said mixture is substantially stiffened, and thereafter milling.

14. The method of making a rubber composition comprising mixing rubber, carbon black, zinc oxide, and an accelerator, subjecting said mixture to heat in the absence of a vulcanizing agent at such temperatures and for a sufficient time to cause stiffening of said mixture, thereafter milling and adding additional zinc oxide, an accelerator, a vulcanizing agent, and additional rubber in such proportions that the relative amounts of the ingredients which were subjected to heat treatment are maintained in the final mixture, milling said composition, and thereafter vulcanizing same.

15. The method of making a rubber stock which comprises mixing the rubber, carbon black, zinc oxide and accelerator, subjecting said mixture to heat in the absence of a vulcanizing agent at such temperatures and for a sufficient time to cause stiffening of said mixture, thereafter milling and adding a vulcanizing agent, and vulcanizing same.

16. A method of producing vulcanized rubber to provide a composition which in the vulcanized state has a higher modulus, decreased permanent set, enhanced wearing and abrasion resisting qualities, and undiminished tensile strength, which includes milling rubber with carbon black, zinc oxide or other reinforcing pigments and without vulcanizing agents to produce a master batch, heating the master batch at a vulcanizing temperature for a time sufficient to substantially stiffen the batch, mixing the master batch with additional rubber and a vulcanizing agent, and vulcanizing such mixture.

17. A method of producing vulcanized rubber to provide a composition which in the vulcanized state has a higher modulus, decreased permanent set, enhanced wearing and abrasion resisting qualities, and undiminished tensile strength, which includes milling rubber with carbon black, zinc oxide or other reinforcing pigments and without vulcanizing agents to produce a master batch, heating the master batch while in a static condition at a vulcanizing temperature of approximately 260° F. to 360° F. for a time sufficient to substantially stiffen the batch, mixing the master batch with additional rubber and a vulcanizing agent, and vulcanizing such mixture.

18. The method of treating rubber which comprises forming a mixture including rubber and carbon black, then subjecting said mixture to heat in the absence of vulcanizing agents until said mixture is substantially stiffened, and then milling said treated mixture.

19. The method of making a rubber composition which comprises mixing rubber and carbon black, subjecting said mixture to heat at such temperatures and for a sufficient time to cause stiffening of said mixture in the absence of vulcanizing agents, milling said mixture and adding zinc oxide, an accelerator, and additional rubber.

20. The method of making rubber stock comprising mixing together rubber, carbon black, zinc oxide, or other reinforcing pigments, subjecting said mixture to heat in the absence of vulcanizing agents until said mixture is substantially stiffened, and thereafter milling, adding zinc oxide or other reinforcing pigments and additional rubber.

21. A method of treating rubber to produce a composition which in the vulcanized state has a higher modulus, decreased permanent set, enhanced wearing and abrasion resisting qualities, and undiminished tensile strength, which includes milling rubber with carbon black, zinc oxide or other reinforcing pigments and without vulcanizing agents to produce a master batch, and heating the master batch at a temperature and for a time sufficient to substantially stiffen the batch.

22. A method of producing vulcanized rubber to provide a composition which in the vulcanized state has a higher modulus, decreased permanent set, enhanced wearing and abrasion resisting qualities, and undiminished tensile strength, which includes milling rubber with carbon black, zinc oxide or other reinforcing pigments and without vulcanizing agents to produce a master batch, heating the master batch at a temperature and for a time sufficient to substantially stiffen the batch, mixing the master batch with a vulcanizing agent and vulcanizing such mixture.

23. The method of treating rubber to produce a composition which in the vulcanized state has a higher modulus, decreased permanent set, enhanced wearing and abrasion resisting qualities, and undiminished tensile strength, which includes milling rubber with carbon black, zinc oxide or other reinforcing pigments and without vulcanizing agents to produce a master batch, and heating the master batch at a temperature and while in a static condition for a time sufficient to substantially stiffen said batch, milling said batch with additional rubber.

24. The method of treating rubber to produce a composition which in the vulcanized state has a higher modulus, decreased permanent set, enhanced wearing and abrasion resisting qualities, and undiminished tensile strength, which includes milling rubber with carbon black, zinc oxide or other reinforcing pigments and without vulcanizing agents to produce a master batch, and heating the master batch while in a static condition at a temperature and for a time sufficient to substantially stiffen said batch, milling said batch and adding a vulcanizing agent.

25. A process of producing a vulcanized rubber product having an unusually high resistance to abrasion which comprises in addition to the conventional steps of plasticizing and mixing a rubber batch to which has been added a relatively large amount of a rubber reinforcing black, the steps of heating the rubber mix when it is substantially homogeneous, in a heater at a temperature above 300° F. and then milling the so heat-treated stock to a smooth, plastic consistency suitable for the incorporation of additional compounding and vulcanizing ingredients without serious degradation of the rubber.

26. A process of producing a vulcanized rubber product having an unusually high resistance to abrasion which comprises in addition to the conventional steps of plasticizing and mixing a rubber batch to which has been added a relatively large amount of a rubber reinforcing black, the steps of heating the rubber mix when it is substantially homogeneous, at a temperature above 300° F. and milling the so heat-treated stock to a smooth, plastic consistency suitable for the incorporation of additional compounding and vulcanizing ingredients without serious degradation of the rubber.

27. A product made by the process of claim 1.
28. A product made by the process of claim 3.
29. A product made by the process of claim 6.
30. A product made by the process of claim 8.
31. A product made by the process of claim 12.
32. A product made by the process of claim 13.
33. A product made by the process of claim 14.
34. A product made by the process of claim 15.
35. A product made by the process of claim 16.
36. A product made by the process of claim 21.
37. A product made by the process of claim 22.
38. A tire having a carcass and a tread, said tread being formed of a vulcanized rubber composition made by the process of claim 22.
39. A product made by the process of claim 26.

HARRY P. BRADLEY.